United States Patent
Mohr et al.

(10) Patent No.: US 9,523,503 B2
(45) Date of Patent: Dec. 20, 2016

(54) METHOD FOR OPERATING A COMBUSTION DEVICE

(75) Inventors: Wolfgang Franz Dietrich Mohr, Niederweningen (CH); Jérôme André Aubry, Wettingen (CH); Christian Steinbach, Birmenstorf (CH); Nicolas Ulibarri, Baden (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 721 days.

(21) Appl. No.: 12/692,042

(22) Filed: Jan. 22, 2010

(65) Prior Publication Data
US 2010/0173253 A1 Jul. 8, 2010

Related U.S. Application Data

(63) Continuation of application No. PCT/EP2008/058939, filed on Jul. 9, 2008.

(30) Foreign Application Priority Data

Jul. 24, 2007 (CH) ...................................... 1176/07

(51) Int. Cl.
*F23N 1/00* (2006.01)
*F23N 5/00* (2006.01)
(Continued)

(52) U.S. Cl.
CPC .................. *F23R 3/28* (2013.01); *F02C 7/228* (2013.01); *F02C 9/28* (2013.01);
(Continued)

(58) Field of Classification Search
CPC ............... F02C 7/228; F02C 9/28; F23R 3/28; F23N 5/08; F23N 2037/02
(Continued)

(56) References Cited

U.S. PATENT DOCUMENTS 5,327,718 A * 7/1994 Iwata et al. ..................... 60/773
5,365,732 A 11/1994 Correa
(Continued)

FOREIGN PATENT DOCUMENTS

| EP | 0529900 | 3/1993 |
|---|---|---|
| JP | 5-052125 | 3/1993 |

(Continued)

OTHER PUBLICATIONS

Search Report for Swiss Patent App. No. 1176/2007 (Dec. 13, 2007).
(Continued)

*Primary Examiner* — William G Corboy
(74) *Attorney, Agent, or Firm* — Buchanan Ingersoll & Rooney PC

(57) ABSTRACT

A combustion device (10) includes at least one combustion chamber (11) with a plurality of burners (B1, . . . , Bn) operating in parallel which produce in each case a flame (F1, . . . , Fn) which reaches into the combustion chamber (11), wherein each of the burners (B1, . . . , Bn), via a fuel distribution system (18), is supplied with a fuel from a fuel supply (16), which fuel distribution system (18) includes control elements (V1, . . . , Vm) for manual or controlled regulating of the fuel supply and/or fuel composition of individual burners (B1, . . . , Bn) and/or groups of burners (B1, . . . , B3; Bn-2, . . . , Bn). In a method of using the combustion device, a quick optimization or homogenization is achieved by a function (F) of the flame temperatures of the burners (B1, . . . , Bn) being provided in dependence upon the positions of the control elements (V1, . . . , Vm) of the fuel distribution system (18), which function has been calibrated by measurements of the flame temperatures at a plurality of predetermined positions of the control elements (V1, . . . , Vm) of the fuel distribution system (18), and in that by the calibrated function (F) the positions of the control elements (V1, . . . , Vm) of the fuel distribution system (18), which are optimum for a predetermined distribution of the flame temperatures of the burners (B1, . . . , Bn), are determined and adjusted.

16 Claims, 1 Drawing Sheet

(51) Int. Cl.
*F23N 5/08* (2006.01)
*F23R 3/28* (2006.01)
*F02C 7/228* (2006.01)
*F02C 9/28* (2006.01)

(52) U.S. Cl.
CPC .. *F05D 2270/082* (2013.01); *F05D 2270/303* (2013.01); *F23N 5/08* (2013.01); *F23N 2021/10* (2013.01); *F23N 2037/02* (2013.01); *F23N 2041/20* (2013.01)

(58) Field of Classification Search
USPC .............................................. 431/12, 75, 79
See application file for complete search history.

(56) References Cited

U.S. PATENT DOCUMENTS

| | | | |
|---|---|---|---|
| 5,480,298 A * | 1/1996 | Brown | 431/79 |
| 5,670,784 A | 9/1997 | Cusack et al. | |
| 6,244,857 B1 * | 6/2001 | VonDrasek et al. | 431/79 |
| 6,318,891 B1 | 11/2001 | Haffner et al. | |
| 2004/0011052 A1 | 1/2004 | Clements | |
| 2006/0144049 A1 * | 7/2006 | Haffner et al. | 60/776 |
| 2007/0119147 A1 | 5/2007 | Cornwell et al. | |

FOREIGN PATENT DOCUMENTS

| | | | |
|---|---|---|---|
| JP | 06101808 A * | 4/1994 | F23C 11/00 |
| JP | 8-004554 | 1/1996 | |
| JP | 2003-232230 | 8/2003 | |
| WO | WO00/52315 | 9/2000 | |
| WO | WO2005/010437 | 2/2005 | |
| WO | WO2009/013136 | 1/2009 | |

OTHER PUBLICATIONS

International Search Report for PCT Patent App. No. PCT/EP2008/058939 (Oct. 20, 2008).
Second Office Action for China Patent App. No. 200880109325.6 (Jan. 29, 2013).

* cited by examiner

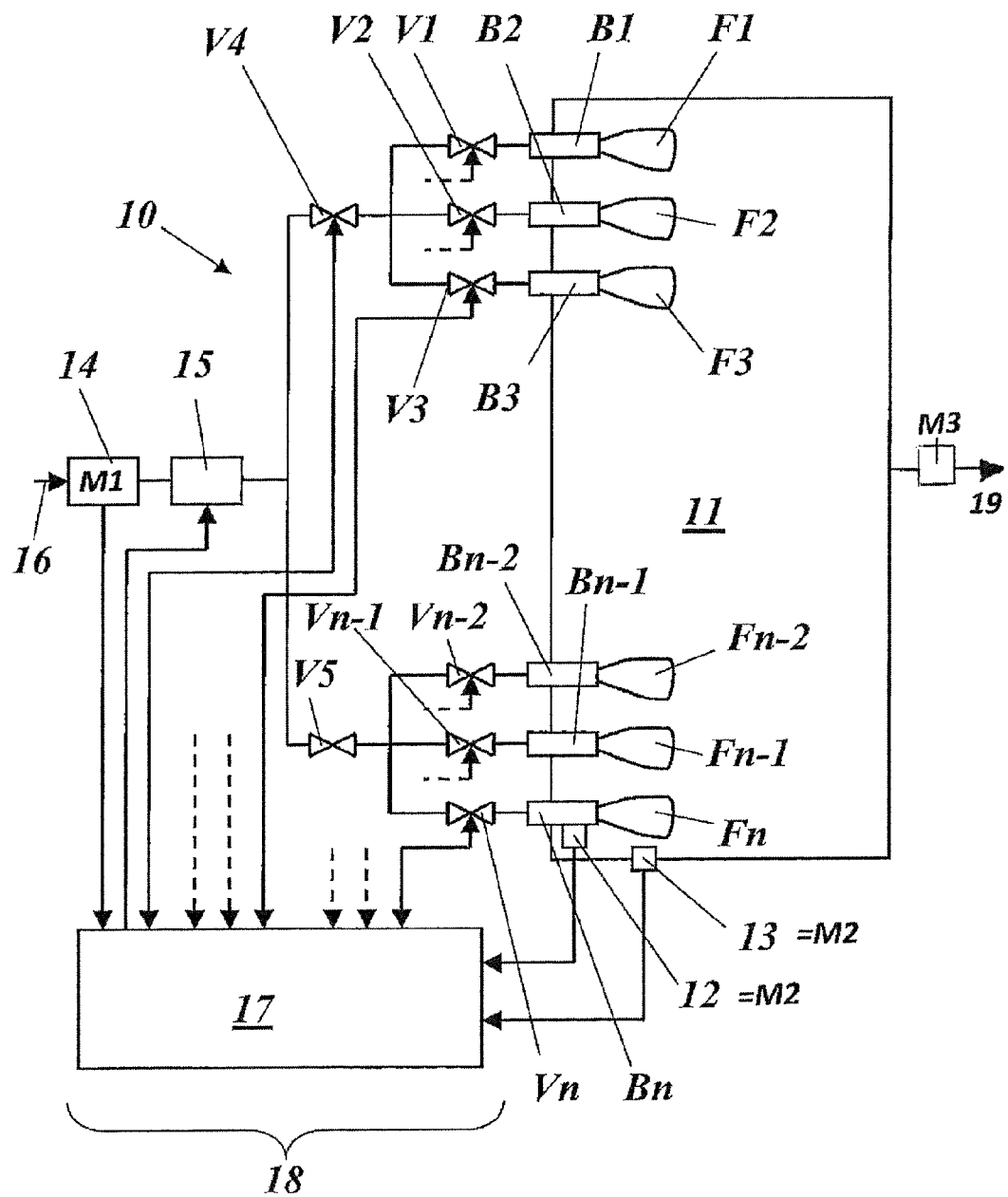

METHOD FOR OPERATING A COMBUSTION DEVICE

This application is a Continuation of, and claims priority under 35 U.S.C. §120 to, International application no. PCT/EP2008/058939, filed 9 Jul. 2008, and claims priority therethrough under 35 U.S.C. §§119, 365 to Swiss application no. 01176/07, filed 24 Jul. 2007, the entireties of which are incorporated by reference herein.

BACKGROUND

Field of Endeavor

The present invention relates to the field of combustion technology, especially for gas turbines. It refers to a method for operating a combustion device and also to a combustion device for carrying out the method.

Brief Description of the Related Art

In combustion chambers with a plurality of burners operating in parallel, as occur in gas turbines, piston engines, and boilers, the flame temperatures of the individual burners are balanced or homogenized for maximizing service life and for minimizing pollutant emission. This homogenization is customarily constructionally achieved by a construction of the individual combustion chambers and their fuel supply which is as identical as possible. However, in the realized system, temperature differences between the burners, which lie above the tolerated value, partially ensue as a result of the interaction of topological differences and a number of tolerance-related deviations.

These production-related differences between the individual burners can be corrected by a non-recurring homogenization. For this, the flame temperatures of the individual burners are measured and balanced by a passive throttling of the fuel supplies (see, for example, WO-A1-2005/010437). As measuring methods for flame temperature determination, the following known methods are currently available:

(1) Calculation of the adiabatic flame temperature on the basis of spectroscopic measurements (see, for example, U.S. Pat. No. 6,318,891).

(2) By indirect measuring via
  (a) the wall temperature of the burner
  (b) the $NO_x$ emission of the burner
  (c) the $CO_2$ content or $O_2$ content of the fuel gas (lambda probe).

(3) Measuring the temperature via the chemiluminescence intensity of the flame, for example the chemiluminescence of the $NO_x$ molecules (see, for example, U.S. Pat. No. 5,670,784).

The optimization process often fails in practice because of the large number of burners which are to be optimized and currently also accommodated in a plurality of combustion chambers, of which burners the flame temperature can only be very slowly determined at the same time. The aforementioned methods for determining the flame temperature, except for the chemiluminescence intensity methods, require a typical measuring duration from about ten seconds to one minute. This time must be compared with the effort for a homogenization of a multi-burner system. A homogenization of N burners, during a mutual influencing of the burners, corresponds to an optimization of a system with N parameters. The measuring effort for such an optimization, even with efficient methods, shifts in the order of magnitude of $N^2$. This leads to more than one day being required for a complete balancing of a system with 50 burners.

Temperature determination on the basis of the intensity of the chemiluminescence was proposed at a very early stage. The intensity of the chemiluminescence I, which is collected by the lens, depends upon the flame temperature T, via a modified Arrhenius law:

$$I(T) = A \cdot \Phi_0^{\frac{(T-T_0)}{\tau}} \quad (1)$$

In this, $\Phi_0$ refers to the radiation density for a flame at the temperature $T_0$. This intensity, as the characteristic value $\tau$, depends upon the composition of the fuel and upon the pressure. The measured intensity I, however, is also determined by the transmissivity and the aperture of the lens, which are summed in the surface parameter A. If all parameters are known, then the temperature determination can be carried out very quickly on the basis of the intensity of the chemiluminescence. Even in the case of burners under pressure (30 bar) and at temperatures of 1200° C., the chemiluminescence intensity is sufficient to be measured with a frequency of up to 10 kHz.

In practice, the temperature determination via the intensity of the chemiluminescence is impractical since the chemiluminescence is very sensitively dependent upon the composition of the air (moisture) of the fuel, and also upon the pressure in the combustion chamber. Even the restriction to individual wave length ranges such as OH*, CH* or NO* brings no improvement at all in this case since the dependency upon the fuel composition occurs in the case of any radical. Moreover, an intensity determination always suffers from a transmission loss of the lens as a result of moisture which can enter quickly at some time during combustion processes.

SUMMARY

One of numerous aspects of the present invention includes a method for operating a combustion device with a multiplicity of burners which quickly leads to a balancing of the differences in the individual burners and, as a result, quickly leads to an optimized operation of the device, and also a combustion device which is suitable for it.

Principles of the present invention start in this case from a system with the following components, as is reproduced in the single FIGURE:

A combustion device 10 with one (or more) combustion chambers 11, which are to be regulated or to be non-recurrently balanced, with a plurality of burners B1, ..., Bn which are supplied with fuel via a fuel distribution system 18 and which produce corresponding flames F1, ..., Fn.

For each burner B1, ..., Bn, a device for direct or indirect determination of its flame temperature. In the FIGURE, for one of the burners (Fn) an intensity-independent temperature measuring device 12 and a temperature measuring device 13, which is based on the chemiluminescence intensity, are exemplarily drawn in.

Control elements such as adjustable nozzles, orifices, restrictors, valves, or flow regulators for the manual or controlled regulating of the fuel supply or fuel composition of individual burners or groups of burners, which control elements are symbolized in the FIGURE by means of the valves V1, ..., Vm, which are arranged between the fuel supply 16 and the burners B1, ..., Bn and responsible for individual burners or burner groups, and by the control unit 17 (the number of control elements in this case can be different from the number of burners).

Possible measured value detectors such as sensors, devices and items of equipment for determining temperature, pressure, density, throughflow, viscosity, thermal conductivity or even composition of the fuel, for which the measuring device M1 and M2 for the fuel are exemplarily drawn in the FIGURE. A further measuring device M3, in the form of a lambda probe, is arranged in an exhaust gas outlet 14 of the combustion chamber 11.

Possible autonomous control units such as flow controllers, pressure controllers, temperature controllers, or controllers for determining the fuel composition, which are exemplarily represented in the FIGURE by a fuel control unit 15.

A simplified system analysis of the piping system of the fuel supply, which characterizes the dependency of the fuel throughflows as a function of the position of the control elements and of the autonomous control units. For improving the calculation of the fuel throughflows, the system analysis also takes into consideration the measured values of possible measured value detectors. This system analysis can be carried out, for example, by a pressure loss calculation, in the case of which the throughflow of a valve is characterized from the valve position and the pressure drop across the valve. The position-dependent resistance coefficient which is required for this must be known as a characteristic of the valve.

An algorithm for minimizing the pollutant emission or for homogenizing the flame temperatures.

The simplified system analysis, in which for quick optimization or homogenization of the combustion device a function of the flame temperatures of the burners is provided in dependence upon the positions of the control elements of the fuel distribution system, which function has been calibrated by measurements of the flame temperatures at a plurality of predetermined positions of the control elements of the fuel distribution system, and by which, with the aid of the calibrated function, the positions of the control elements of the fuel distribution system which are optimum for a predetermined distribution of the flame temperatures of the burners are determined and adjusted, is important for embodiments of the invention.

A development of the method according to principles of the invention is characterized in that the combustion device has a measuring device for determining the properties of the fuel, such as temperature, pressure, density, throughflow, viscosity, thermal conductivity, and composition, and in that the measured values of the measuring device are integrated as variables into the function of the flame temperatures.

One development of the method is characterized in that the combustion device has a fuel control device for autonomous controlling of the properties of the fuel, such as throughflow, pressure, temperature, or composition, and in that the function is established in dependence upon the control values of the fuel control device.

Another development of the method according to principles of the invention is characterized in that a valve with a fixed characteristic is connected upstream of each burner in the fuel distribution system, and in that, for determining the function, the anticipated flame temperature of the respective burner is assumed as being proportional to the fuel inflow through the valve which is connected upstream of it.

A further development of the method according to principles of the invention is characterized in that the flame temperatures of the flames of the individual burners are first measured, and in that the combustion device is homogenized in accordance with the measured flame temperatures.

Another development of the method according to principles of the invention is characterized in that the flame temperatures of the flames of the individual burners are first measured, and in that the combustion device is optimized in accordance with the measured flame temperatures.

A further development of the method according to principles of the invention is characterized in that the flame temperatures of the flames of the individual burners are first measured, and in that the combustion device is controlled with regard to the ongoing optimization in accordance with the measured flame temperatures.

In this case, the flame temperatures of the flames of the individual burners can especially be determined via a measuring of the chemiluminescence intensity.

It is especially advantageous if the measuring of the chemiluminescence intensity is recalibrated at periodic intervals of time by an intensity-independent method for measuring the flame temperature, wherein a method for measuring the flame temperature, which is based on a throughflow characteristic of the control elements which are responsible for the fuel throughflow, is used as the intensity-independent recalibration method.

An advantageous development of the combustion device according to principles of the invention is characterized in that the fuel distribution system has a fuel measuring device for determining the properties of the fuel, such as temperature, pressure, density, throughflow, viscosity, thermal conductivity, and composition, and a fuel control device for autonomously controlling the properties of the fuel, such as throughflow, pressure, temperature, or composition, which components are connected to the control unit.

In particular, a valve for adjusting the fuel throughflow to the associated burner is associated with each of the burners as a control element, wherein the valves are connected to the control unit.

BRIEF DESCRIPTION OF THE DRAWINGS

The invention shall subsequently be explained in more detail based on exemplary embodiments in conjunction with the drawing. The single FIGURE shows a greatly simplified system schematic of a combustion device according to an exemplary embodiment of the invention.

DETAILED DESCRIPTION OF EXEMPLARY EMBODIMENTS

Since flame temperatures react very sensitively to the smallest deviations of fuel and air throughflows, even time-consuming calculations are not sufficient for being able to accurately precalculate enough the flame temperature of an individual burner. The deviations can be determined and corrected by an additional measurement of the flame temperature. Since such measurements, however, demand a lot of time, a complete optimization of a system with a plurality of burners often requires too long to be economical.

Principles of the present invention start here, since it significantly accelerates this adjustment process by two strategies:

The first strategy shortens the determination of the flame temperature to below one second and the second strategy shortens the optimization process to a determination of a few parameters for calculating the flame temperature, the number of which is proportional to the number of burners. By combining these two strategies, the homogenization process becomes quick so that the balancing of the flame temperatures can be carried out in a controlled manner not only periodically but even constantly.

The new idea for accelerating the flame temperature determination is a permanently recalibrated measuring of the chemiluminescence intensity. With this, the advantages of two established measuring methods are combined. The disadvantages of the intensity measuring method can be counteracted by combination with an intensity-independent temperature measurement, by which the intensity measurement is regularly recalibrated, for example in a ten-minute cycle.

For practical reasons, the intensity of turbulent flames and flame temperature fluctuations of short duration differs between oscillations. Changes of the intensity of the chemiluminescence, which take place quicker than a determined limiting frequency (in the case of the gas turbine about 8 Hz), are considered as oscillations, while slower changes are interpreted as a change of the flame temperatures. The limiting frequency in this case is determined by the time delay across the control system between the control element of the fuel supply and the flame. Frequencies with periods below this time delay are interpreted as oscillations.

The new idea for accelerating the optimization exists in restoring the system, by a complete analysis, to an analytical function F of the type $$T=F(s,x,y) \quad (2)$$

In this case, T refers to an N-dimensional vector which includes the flame temperatures of the individual burners. The M-dimensional vector s includes the positions of the control elements. Ideally, there is only one control element for each burner, as a result of which N is equal to M. In practice, however, M>N is selected in most cases. The K-dimensional vector x includes the measured values of the possible measured value detectors and also the control values of the possible autonomous control units. Since these measured variables are possibly not raised at all, the dimension K can therefore also be 0. Furthermore, the system analysis L includes estimated deviations which are gathered in the L-dimensional vector y. These can be, for example, the deviations of the pressure differences which influence the throughflow. These unknown deviations lead to the function F, in the case of N=M, not being able to be directly resolved according to s. The system must therefore first be calibrated. The calibration is achieved by the system being checked during n different adjustments $s^i$. In this case, the M-dimensional vector of all the M control elements is again understood by $s^i$. For each control vector, the resulting temperature vector $T^i$, together with the measured values of the measured value detectors and the control values of the autonomous control units $x^i$, must now be determined. By the measurement results, the deviations y can then be determined by a weighted $X^2$-adaptation test. For this, the variable $$X^2(y)=\Sigma_{i=1}^{n}(F(s^i,x^i,y)-T^i)^T V_T^{-1}(F(s^i,x^i,y)-T^i) \quad (3)$$

is minimized by a a variation of y. In this case, $V_T$ stands for the N×N-dimensional weighting matrix which results from the static precision of the temperature measurement. Minimizing can be quickly carried out since F is an analytical function, the derivation of which can be calculated. For this purpose, by an iterative numeric method and a sufficiently large number of measurements n·N>L, an optimum $y^{min}$ can be found. With a known $y^{min}$, the system is calibrated.

With the calibrated system, for any control value x, the optimum positions $s^{min}(x)$ of the control elements can be determined for the desired temperatures $T^h$. For this, by an $X^2$-adaptation test, the variable $$X^2(y)=\Sigma_{i=1}^{n}(F(s,x,y^{min})-T^h)^T V_T^{-1}(F(s,x,y^{min})-T^h) \quad (4)$$

is minimized by a variation of s. The numerically resulting value $s^{min}(x,T^h)$ then provides the sought-after positions.

Summarized, the measuring task which is to be overcome is reduced to n·N>L calibration measurements. The actual optimization is then carried out by a purely numeric method without further measurements.

This method shall subsequently be explained based on a simplified example:

A simplified system without possible sensors or autonomous control units with K=0 is to be tested. The system is to include N burners B1, . . . , Bn. A valve V1, . . . , V3; Vn-2, . . . , Vn with a fixed characteristic ζ(s) is located upstream of each burner B1, . . . , Bn in its fuel supply.

$$\Delta p = \frac{\zeta(s)\rho}{2} v^2 \quad (5)$$

The fuel in this case is to be reduced to the pressure $p_1$ via a pressure regulator, from where the fuel is fed by a distribution system to the valves V1, . . . , V3; Vn-2, . . . , Vn. The pressure drops in this distributor are ignored. The pressure differences in the common combustion chamber 11 with pressure $p_2$ are also ignored so that the pressure drops $p_1$-$p_2$ are identical for all burners of the combustion chamber. From this, for constructionally identical valves with the pipe cross section A, the throughflow q is calculated as $$q(s) = A \cdot \sqrt{\frac{2\rho(p_1 - p_2)}{\zeta(s)}} \quad (6)$$

For simplicity it is now assumed that the anticipated flame temperature is proportional to this fuel inflow, or that higher terms can be ignored:

$$T_k = T^r + a \cdot (q(s_k) - q(s^r)) = F_k(s_k). \quad (7)$$

In this, a sums the gross calorific value of the fuel, its specific heat, the specific heat of the inlet air, and also the air ratio of the combustion. Equation (7) is the sought-after system function F for y=0 with the dimension N. As deviations, the unknown transmissivities of the optical sensors are used.

From equation (1), the flame temperature of the $k^{th}$ burner (Bk) on the basis of its intensity $I_k$ of chemiluminescence is calculated as:

$$T_k = T^0 + \tau ln(I_k) - \tau ln(A_k \cdot \Phi^0). \quad (8)$$

As the measured temperature, $$T'_k = T^0 + \tau ln(I_k) \quad (9)$$

is used, so the last term on the right in equation (8) can be added to the system function F of equation (7):

$$T'_k = T^r + a \cdot (q(s_k) - q(s^r)) + \tau \cdot y_k = F'_k(s_k), \text{ with } y_k = ln(A_k \Phi^0) \quad (10)$$

The calibration function for F which is to be resolved now results as the sum across the different measurements i and sum across each burner k of the intensities $I_k^i$ which were determined in the case of the manipulated variables $s_k^i$:

$$X^2(y) = \sum_{i=1}^{n} \sum_{k=1}^{N} (y_{N+1} + y_{N+2} \cdot q(s_k^i) + y_k - \ln(I_k^i))^2 \qquad (11)$$

wherein $y_{N+1}$ aggregates the following terms which are not linearly independent of each other $$y_{N+1} = \frac{T^r - a \cdot q(s^r) - T^0}{\tau} \qquad (12)$$

and $y_{N+2}$ characterizes the two unknowns a and $\tau$ which can only be optimized together:

$$y_{N+2} = \frac{a}{\tau} \qquad (13)$$

In the case of the calibration equation (11), it is a linear (L=N+2)-dimensional $X^2$-adaptation test which can be resolved by known linear algebraic methods according to the calibration values $y^{min}$.

As soon as the system is calibrated, or the $y_k^{min}$ are known, the valve positions can be determined. For this, the homogenization condition of identical flame temperatures $T^h$ must be defined in the N-dimensional $X^2$-adaptation test for s:

$$X^2(s) = \sum_{k=1}^{N} \frac{(F_k(s) - T^h)^2}{\tau} \qquad (14)$$

$$= \sum_{k=1}^{N} \frac{(T^r + a \cdot (q(s_k) - q(s^r)) - T^h)^2}{\tau}$$

with equations (12) and (13) follows:

$$X^2(s) = \sum_{k=1}^{N} \left( y_{N+1}^{min} + \frac{T^0 - T^h}{\tau} + y_{N+2}^{min} \cdot q(s_k) \right)^2 \qquad (15)$$

This $X^2$-adaptation test has the solution:

$$q(s_k) = \frac{T^h - T^0}{a} - \frac{y_{N+1}^{min}}{y_{N+2}^{min}}. \qquad (16)$$

These are the throughflow values which are to be selected for the valves V1, ..., V3, ..., Vm−2, ..., Vm, which homogenize in the best possible way the flame temperatures of the burners B1, ..., Bn to the temperature $T^h$. From the known characteristic of the valve (equation (6)), the sought-after manipulated variable $s_k$ can finally be calculated.

Reference should be made to the fact that, in the case of this example, the anticipated solution actually emerges. According to the assumptions made, the flame temperatures result directly from the throughflow of the valves V1, ..., V3, ..., Vm−2, ..., Vm. A mutual dependency or correlation between the burners B1, ..., Bn is lacking, which is why the above solution can also be derived for each burner separately from the system function (7). The calibration of this simple system therefore corresponds rather to a gauging of the intensity measuring on the basis of the valve positions, which indeed clearly determines the flame temperature of an individual burner.

In general, this is not the case since the burners one below the other are correlated with each other via the airflow or the fuel distribution system. Therefore, with correlated burners the calibration of the flame temperature can also be carried out via the variation of the control units. As a result of this simplified example, the basis for the idea of an intensity-independent recalibration method on the basis of the throughflow characteristic of the control elements is created, which allows the intensity measuring of the chemiluminescence to be calibrated by a generic valve characteristic. Furthermore, this idea can be combined with the optimization, forming a flame homogenization, which in the case of known characteristics of the control elements can be carried out by pure intensity measurements of the chemiluminescence. This simplification is apparent from the equation (11).

Overall, the following solutions for a multiburner system are described:

(1) A quick flame temperature determination based on a calculation of the temperature on the basis of the chemiluminescence intensity which is quick to measure and a periodic recalibration by an intensity-independent method.

(2) An accelerated flame homogenization based on a system analysis and a numeric optimization method which is derived therefrom.

(3) The combination of the quick flame temperature measurement with the accelerated optimization method for the harmonization of systems with a plurality of burners.

(4) The combination of the quick flame temperature measurement with the accelerated optimization method for the controlling of systems with a multiplicity of burners.

(5) An intensity-independent recalibration method based on the throughflow characteristic of the control elements.

(6) A method for the flame homogenization of systems with a plurality of burners on the basis of measuring the intensity of the chemiluminescence, based on the throughflow characteristic of the control elements.

List Of Designations
10 Combustion device
11 Combustion chamber
12 Temperature measuring device (intensity-independent)
13 Temperature measuring device (chemiluminescence intensity)
14 Exhaust gas outlet
15 Fuel control device (autonomous)
16 Fuel supply
17 Control unit
18 Fuel distribution system
V1, ..., Vm Control element (for throughflow control)
B1, ..., Bn Burner
F1, ..., Fn Flame
M1, ..., M3 Measuring device While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a combustion device, the combustion device including at least one combustion chamber with a plurality of burners operating in parallel which each produce a flame which reaches into the combustion chamber, wherein each of the burners, via a fuel distribution system, is supplied with a fuel from a fuel supply, which fuel distribution system includes control elements for manual or controlled regulation of the fuel supply and/or fuel composition of individual burners and/or groups of burners, the method comprising:
   determining a function (F) of the flame temperature of the burners for homogenization of the combustion device in dependence upon the positions of the control elements of the fuel distribution system, the function (F) calibrated by measurements of the flame temperatures at a plurality of predetermined positions of the control elements, and wherein the function (F) is an analytical function of a type T=F(s, x, y), where T refers to an N-dimensional vector which includes the flame temperatures of the individual burners, a M-dimensional vector s includes positions of the control elements, a K-dimensional vector x includes measured values of measured value detectors and control values of autonomous fuel control devices and an L-dimensional vector y includes estimated deviations that influence throughflow characteristics of the control elements; and
   determining and adjusting the positions of the control elements of the fuel distribution system which are optimum for a predetermined distribution of the flame temperatures of the burners based on the calibrated function (F).

2. The method as claimed in claim 1, wherein the combustion device comprises a measuring device, which is configured and arranged to determine properties of the fuel selected from the group consisting of temperature, pressure, density, viscosity, thermal conductivity, and composition, and further comprising:
   integrating the measured values of the measuring device as variables into the function (F) of the flame temperatures.

3. The method as claimed in claim 2, wherein each fuel control device is configured and arranged to autonomously control properties of the fuel selected from the group consisting of pressure, temperature, and composition, and wherein determining the function (F) comprises determining in dependence upon control values of the fuel control devices.

4. The method as claimed in claim 1, wherein a valve with a fixed characteristic is connected upstream of each burner in the fuel distribution system, and wherein determining the function (F) comprises setting an anticipated flame temperature of each burner as being proportional to the fuel inflow through each upstream valve.

5. The method as claimed in claim 1, further comprising:
   measuring the flame temperatures of the flames of each burner; and
   homogenizing the combustion device based on the measured flame temperatures.

6. The method as claimed in claim 5, wherein measuring the flame temperatures of the flames of each burner comprises measuring the intensity of the flames' chemiluminescence.

7. The method as claimed in claim 6, wherein measuring the intensity of the chemiluminescence comprises recalibrating the measuring at periodic intervals of time with an intensity-independent method for measuring the flame temperature.

8. The method as claimed in claim 7, wherein the intensity-independent recalibration method comprises measuring the flame temperature based on the throughflow characteristic of the control elements which are responsible for the fuel throughflow.

9. A method for operating a combustion device, the combustion device including at least one combustion chamber with a plurality of burners operating in parallel which each produce a flame which reaches into the combustion chamber, wherein each of the burners, via a fuel distribution system, is supplied with a fuel from a fuel supply, which fuel distribution system includes control elements for manual or controlled regulation of the fuel supply and/or fuel composition of individual burners and/or groups of burners, the method comprising:
   determining a function (F) of the flame temperature of the burners for homogenization of the combustion device in dependence upon the positions of the control elements of the fuel distribution system, the function (F) calibrated by measurements of the flame temperatures at a plurality of predetermined positions of the control elements, and wherein the function (F) is of a type T=F(s, x, y), where T refers to an N-dimensional vector which includes the flame temperatures of the individual burners, a M-dimensional vector s includes positions of the control elements, a K-dimensional vector x includes measured values of measured value detectors and control values of autonomous fuel control devices and an L-dimensional vector y includes estimated deviations that influence throughflow characteristics of the control elements, and wherein each of said measurements being performed in less than one second; and
   determining and adjusting the positions of the control elements of the fuel distribution system which are optimum for a predetermined distribution of the flame temperatures of the burners based on the calibrated function (F).

10. The method as claimed in claim 9, wherein the combustion device comprises a measuring device, which is configured and arranged to determine properties of the fuel selected from the group consisting of temperature, pressure, density, viscosity, thermal conductivity, and composition, and further comprising:
    integrating the measured values of the measuring device as variables into the function (F) of the flame temperatures.

11. The method as claimed in claim 10, wherein each fuel control device is configured and arranged to autonomously control properties of the fuel selected from the group consisting of pressure, temperature, and composition, and wherein determining the function (F) comprises determining in dependence upon control values of the fuel control devices.

12. The method as claimed in claim 9, wherein a valve with a fixed characteristic is connected upstream of each burner in the fuel distribution system, and wherein determining the function (F) comprises setting an anticipated flame temperature of each burner as being proportional to the fuel inflow through each upstream valve.

13. The method as claimed in claim 9, further comprising:
measuring the flame temperatures of the flames of each burner; and
homogenizing the combustion device based on the measured flame temperatures.

14. The method as claimed in claim 13, wherein measuring the flame temperatures of the flames of each burner comprises measuring the intensity of the flames' chemiluminescence.

15. The method as claimed in claim 14, wherein measuring the intensity of the chemiluminescence comprises recalibrating the measuring at periodic intervals of time with an intensity-independent method for measuring the flame temperature.

16. The method as claimed in claim 15, wherein the intensity-independent recalibration method comprises measuring the flame temperature based on the throughflow characteristic of the control elements which are responsible for the fuel throughflow.

\* \* \* \* \*